(No Model.)

J. T. HARKER.
AXLE NUT.

No. 433,730. Patented Aug. 5, 1890.

Witnesses:
John Wilson Orr
John J. Geary

Inventor:
John T. Harker
by his Attorneys
Howson & Howson

UNITED STATES PATENT OFFICE

JOHN T. HARKER, OF CAMDEN, NEW JERSEY.

AXLE-NUT.

SPECIFICATION forming part of Letters Patent No. 433,730, dated August 5, 1890.

Application filed June 17, 1889. Serial No. 314,580. (No model.)

*To all whom it may concern:*

Be it known that I, JOHN T. HARKER, a citizen of the United States, and a resident of Camden, New Jersey, have invented certain Improvements in Nut-Retainers for Vehicles, of which the following is a specification.

The object of my invention is to provide simple and efficient means whereby to prevent the backing off of the nut which holds the wheel-hub of a vehicle in position upon the journal of the axle; and this object I attain in the manner hereinafter set forth, reference being had to the accompanying drawings, in which—

Figure 1:
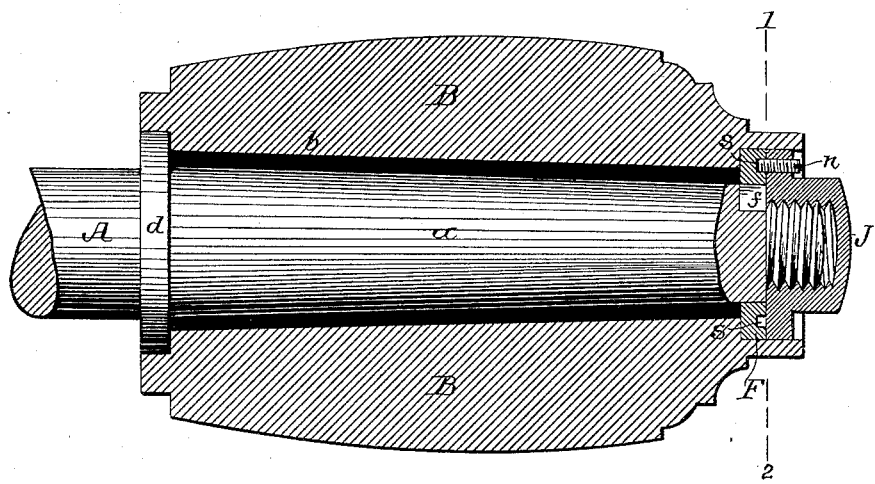
Figure 2:
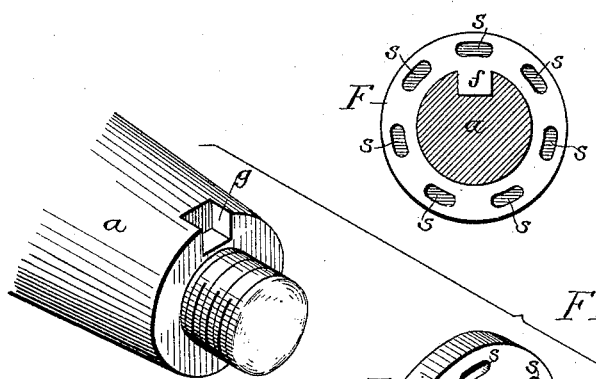

Figure 1 is a transverse section, partly in elevation, of part of the axle of a vehicle and of a wheel-hub adapted to the journal thereof, showing my improved means for retaining this wheel-hub on the journal. Fig. 2 is a transverse section on the line 1 2, Fig. 1; and Fig. 3 is a perspective view of the parts detached from each other.

A represents part of the axle of a vehicle, and $a$ the journal of the same, which, as shown in the present instance, is tapered for adaptation to the tapering journal-box $b$, carried by the hub B of the wheel, this journal-box having its inner end bearing against a collar $d$, formed upon the axle at the inner end of the journal, as shown in Fig. 1. The journal projects slightly beyond the journal-box at the outer end of the hub, and to this projecting portion of the journal is adapted a washer F, which has a projecting tongue or lug $f$, adapted to a recess $g$, formed in the projecting portion of the journal, as shown in Fig. 3. Beyond the washer the journal is still further reduced, and is threaded for the reception of the retaining-nut J, which when screwed up to the full extent bears upon the washer and presses the same against the outer end of the journal-box of the hub, so as to properly confine said hub longitudinally on the journal. As the washer is rigidly confined to the journal by reason of the engagement of its tongue $f$ with the recess $g$ in said journal, backward movement of the hub on the journal can exert no backing-off influence upon the confining-nut, the latter always having its bearing upon the non-rotating washer F, so that a prolific source of accident attending the use of the usual retaining devices is effectually overcome. There might, however, be some tendency of the retaining-nut to become loosened and in time back off of the journal by reason of the jarring of the latter, especially in cases where the vehicle is much used in traveling rough roads; hence I provide the usual flange $m$ of the retaining-nut with a screw-threaded pin $n$, which may be adapted to any one of a series of recesses $s$, formed in the face of the washer F, as shown in Fig. 3, so that when the nut is screwed up as tightly as may be the pin may be caused to engage with one of these recesses, and thus prevent the loosening of the nut by any jarring action.

Figure 3:
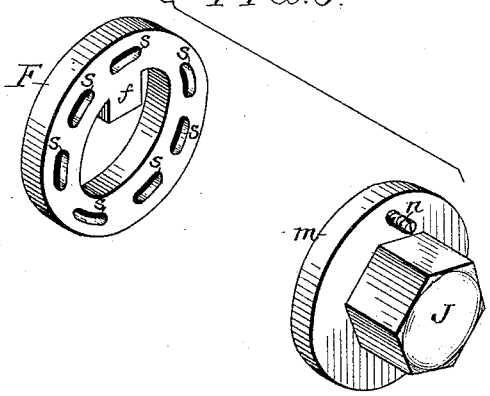

The recesses in the washer may, if desired, be simply threaded openings for the reception of the threaded pin, although it is preferable to make the recesses slightly elongated, as shown in Fig. 3, so as to increase the probability of the screw-pin registering with one of these openings when the nut is screwed up tight.

When it is desired to remove the nut J, the screw-pin $n$ is simply backed off sufficiently to withdraw its inner end from the recess or opening in the washer, there being no necessity for withdrawing the screw-pin from the flange of the nut, so that said pin cannot be lost or mislaid, but is always in position for re-engagement with the washer when the nut has been again applied to the axle.

Having thus described my invention, I claim and desire to secure by Letters Patent—

The combination of the wheel-hub and its journal-box, the journal having a recess therein and a threaded portion beyond the recess, the washer having a tongue adapted to the recess and having elongated openings in its face, a nut adapted to the threaded outer end of the journal and having a threaded opening formed in it, and a screw-pin adapted to said opening whereby the inner end of said pin may be caused to project into or may be withdrawn from the openings in the face of the washer, substantially as specified.

In testimony whereof I have signed my name to this specification in the presence of two subscribing witnesses.

JOHN T. HARKER.

Witnesses:
ALBERT POPKINS,
HARRY SMITH.